United States Patent
Chujo et al.

(10) Patent No.: US 7,067,082 B2
(45) Date of Patent: Jun. 27, 2006

(54) METHOD FOR PRODUCING A MOLDED RESIN LAMINATE

(75) Inventors: Kenichi Chujo, Tochigi-ken (JP); Kazushiro Wakabayashi, Utsunomiya (JP); Hiroe Hashimoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/793,898

(22) Filed: Mar. 8, 2004

(65) Prior Publication Data

US 2004/0169301 A1 Sep. 2, 2004

Related U.S. Application Data

(62) Division of application No. 09/826,012, filed on Apr. 5, 2001, now abandoned.

(30) Foreign Application Priority Data

Apr. 5, 2000 (JP) .............................. 2000-103666

(51) Int. Cl.
*B29C 51/10* (2006.01)
(52) U.S. Cl. ...................... 264/321; 264/553; 264/554; 156/245
(58) Field of Classification Search ................. 264/321, 264/553, 554; 156/245
See application file for complete search history.

(56) References Cited

U.S. PATENT DOCUMENTS 3,889,032 A 6/1975 Koelsch
4,911,978 A * 3/1990 Tsubone et al. ......... 428/317.9
6,203,751 B1 * 3/2001 Rolle et al. ................. 264/554

FOREIGN PATENT DOCUMENTS

DE 29 24 499 A1 1/1980

(Continued)

OTHER PUBLICATIONS

Patent Abstracts of Japan, Publ. No. 07164588 A, Jun. 27, 1995, "Interior Molded Product for Vehicle", Toray Ind. Inc., Akimaru Fusakichi et al.

*Primary Examiner*—Allan R. Kuhns
(74) *Attorney, Agent, or Firm*—Birch Stewart Kolasch & Birch LLP (57) ABSTRACT

A molded resin laminate in which the dimensional accuracy and the strength are excellent at a bent portion and a method for producing the same are provided. One, in which an average diameter of small cells existing in a region on a side of a resin cover to be formed into a surface layer is smaller than an average diameter of large cells existing in a region on a side of a base resin component to be formed into a base layer, is used as a foamed resin component to be formed into an intermediate layer of the molded resin laminate. After the base resin component is molded with a molding machine, the base resin component is held on a male mold of a forming machine different from the molding machine described above. A sheet-shaped laminate, which is obtained by joining the foamed resin component and the resin cover, is arranged between the base resin component and a female mold. Subsequently, the forming machine is subjected to mold clamping. The sheet-shaped laminate and the base resin component are joined to one another in a cavity, and the gas in the cavity is vacuum-evacuated to thereby form the sheet-shaped laminate.

18 Claims, 11 Drawing Sheets

FOREIGN PATENT DOCUMENTS

| | | |
|---|---|---|
| DE | 689 18 159 T2 | 12/1989 |
| DE | 40 05 624 A1 | 8/1991 |
| DE | 43 23 590 A1 | 3/1994 |
| EP | 0 331 447 B1 * | 6/1994 |
| GB | 2 024 101 A | 1/1980 |
| JP | 09012762 A | 1/1997 |

\* cited by examiner

METHOD FOR PRODUCING A MOLDED RESIN LAMINATE

CROSS-REFERENCE TO RELATED APPLICATION

This application is a Divisional of co-pending application Ser. No. 09/826,012, filed on Apr. 5, 2001 now abandoned, the entire contents of which are hereby incorporated by reference and for which priority is claimed under 35 U.S.C. § 120; and this application claims priority of Application No. 2000-103666 filed in Japan on Apr. 5, 2000 under 35 U.S.C. § 119.

BACKGROUND OF THE INVENTION

1. Field of the Invention

The present invention relates to a molded resin laminate and a method for producing the same. Specifically, the present invention relates to a molded resin laminate which is excellent in dimensional accuracy and strength of a bent portion or a curved portion. The present invention also relates to a method for producing such a molded resin laminate.

2. Description of the Related Art

Figure 10:
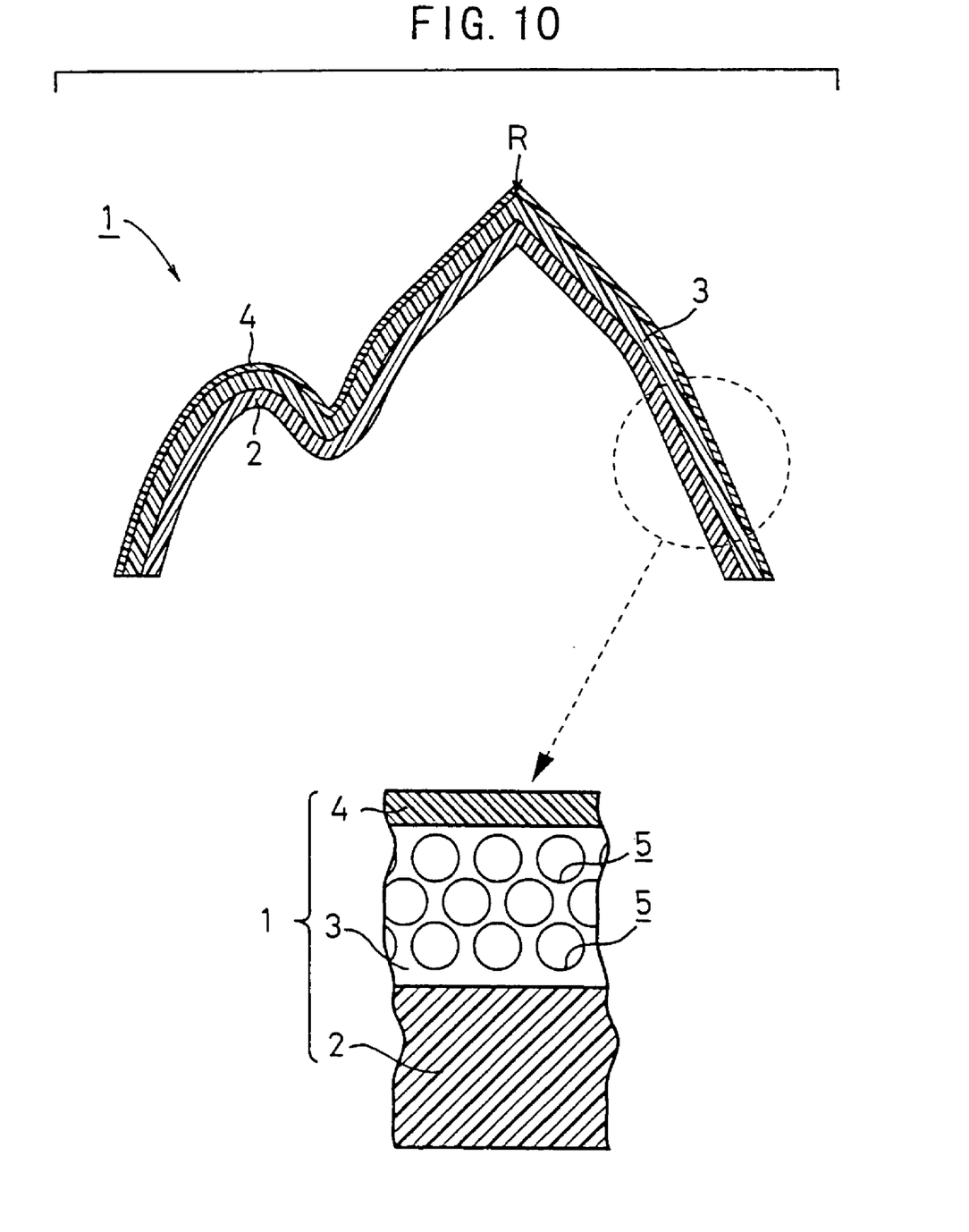
FIG. 10 shows a schematic vertical sectional view illustrating a molded resin laminate concerning the conventional technique, and it shows a magnified view illustrating major parts thereof.

FIG. 10 shows a schematic vertical sectional view and a magnified view of major parts of a molded resin laminate concerning a conventional technique. The molded resin laminate 1 comprises a base layer 2, an intermediate layer 3, and a surface layer 4 which are joined to one another in this order. All of the respective layers 2 to 4 are made of resin materials. Among the above layers, the intermediate layer 3 is composed of a foamed resin component in which cells 5 having approximately equal diameters with each other are dispersed substantially uniformly.

The molded resin laminate 1 is produced as follows.

At first, an injection molding machine is subjected to the mold clamping, and then a molten resin (molten material) is injected into a cavity of the injection molding machine. The molten material is cooled and solidified, and thus a base resin component, which is composed of a molded resin piece, is prepared.

Subsequently, after the mold opening is performed, the base resin component is taken out and it is held on a first mold of a vacuum forming machine. In this state, an adhesive is applied to the surface of the base resin component.

Subsequently, a sheet-shaped laminate, which is composed of a foamed resin component and a resin cover joined to the foamed resin component, is arranged between the base resin component and a second mold of the vacuum forming machine so that the foamed resin component may be opposed to the base resin component. Then, the mold clamping is performed. As a result, the sheet-shaped laminate is coarsely bent and deformed along the shape of the mold.

Further, the gas in the cavity is vacuum-evacuated by the aid of the mold disposed on the side to make abutment against the sheet-shaped laminate so that the pressure in the cavity may be a negative one. Accordingly, the sheet-shaped laminate is allowed to make tight contact with the mold. Accordingly, the sheet-shaped laminate is finely bent and deformed along the shape of the mold, and a boarding or graining pattern is transferred to the surface layer. Thus, a bent section R (see FIG. 10) is formed which has a predetermined superficial shape and a bending ratio.

After the vacuum evacuation of the gas from the cavity is completed, the compressed gas is supplied to the cavity via passages previously formed in the mold with which the sheet-shaped laminate makes the tight contact, or the passages are allowed to be open to the atmospheric air, and the gas in the cavity is vacuum-evacuated via gas-aspirating holes which are previously formed in the base resin component and the mold with which the base resin component makes the tight contact respectively. Accordingly, the foamed resin component is directed to and pressed against the base resin component. Therefore, both of the foamed resin component and the base resin component are strongly joined to one another by the aid of the adhesive.

Finally, the mold opening is performed after completing the supply of the compressed gas to the cavity and the vacuum evacuation of the gas from the cavity. Thus, the molded resin laminate 1 is obtained which comprises the base layer 2 composed of the base resin component, the intermediate layer 3 composed of the foamed resin component, and the surface layer 4 composed of the resin cover. The base layer 2, the intermediate layer 3, and the surface layer 4 are joined to one another in this order.

The molded resin laminate 1 produced as described above is used as an instrument panel, a bumper of an automobile or the like.

Figure 11:
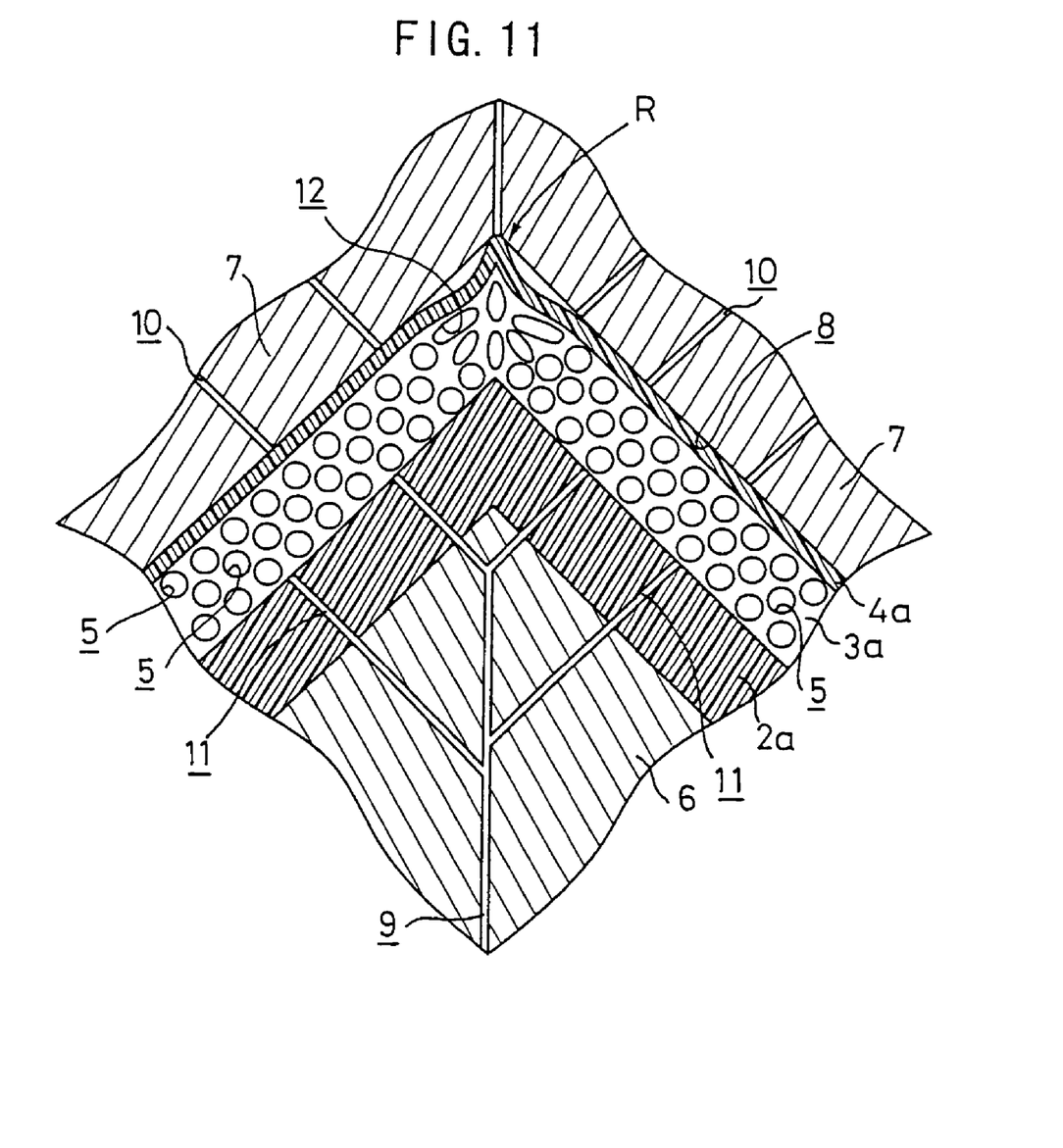
FIG. 11 shows, with partial omission, a vertical sectional view illustrating a state in which the gas is vacuum-evacuated from the inside of a cavity when the molded resin laminate shown in FIG. 10 is produced.

In the method for producing the molded resin laminate concerning the above conventional technique, shrinkage cavity may appear at the bent section R of the molded resin laminate 1 or the strength of the bent section R may be unsatisfactory. The reason is that the ductility of the foamed resin component to be formed into the intermediate layer 3 is poor. Therefore, the foamed resin component 3a is insufficiently expanded and elongated as shown in FIG. 11 when the sheet-shaped laminate is allowed to make tight contact with the mold by giving the negative pressure in the cavity to form the bent section R. Further, since the resin cover 4a is joined to the foamed resin component 3a, the expansion and the elongation of the resin cover 4a are quite limited. The shrinkage cavity appears at the bent section R for this reason as well.

In FIG. 11, reference numeral 2a indicates the base resin component to be formed into the base layer 2. Reference numerals 6, 7 indicate a male mold and a female mold which are provided for the unillustrated vacuum forming machine. The cavity 8 is formed by clamping both of the molds 6, 7. Reference numerals 9, 10 indicate gas-aspirating holes formed in the male mold 6 and the female mold 7 respectively. Reference numeral 11 indicates holes which are formed in the base resin component 2a and which communicate with the gas-aspirating holes 9 of the male mold 6.

Because the foamed resin component 3a is expanded and elongated at the bent section R, the wall thickness of the foamed resin component 3a becomes thin thereat. The strength of the bent section R is consequently decreased as compared with that of flat portions. Furthermore, any crack 12 may appear since the cell 5 is extended, and the cells 5, 5 are deformed and connected to one another. Then, the strength of the bent section R is further decreased.

That is, the method for producing the molded resin laminate concerning the conventional technique involves a problem that it is impossible to produce, with a satisfactory yield, any molded resin laminate 1 which is excellent in dimensional accuracy and strength of the bent section.

On the other hand, Japanese Laid-Open Patent Publication No. 9-12762 discloses a foamed resin component in which the diameter of cells disposed at a central portion is larger than that of the cells disposed at a surface layer portion. According to the above patent document, when the foamed resin component is joined to a surface coating material composed of a resin material or a cloth at a high temperature, an irregularity does not occur in the foamed resin component. In a laminate thus obtained, an air does not invade the space between the surface coating material and the foamed resin component.

It is certain that detailed evaluation is made for a case in which the single foamed resin component is subjected to a vacuum forming process in the above patent document. However, no trial is made to perform a vacuum forming process for the surface coating material and the foamed resin component integrally. Therefore, no trial is made to suppress the occurrence of the shrinkage cavity on the surface coating material in this process as well.

That is, no technique has been hitherto established to suppress the occurrence of the shrinkage cavity on the surface layer 4 when the foamed resin component 3a and the resin cover 4a are integrally subjected to a vacuum forming process as described above.

SUMMARY OF THE INVENTION

The present invention has been made in order to solve the problems described above, an object of which is to provide a molded resin laminate and a method for producing the same in which a bent section is formed with a good dimensional accuracy, and the bent section is excellent in strength.

According to the present invention, a molded resin laminate is provided which is produced by joining a resin cover and a base resin component held on a mold of a forming machine to one another with a foamed resin component intervening therebetween in a cavity of the forming machine, and forming the resin cover and the foamed resin component by evacuating gas from the cavity; wherein the molded resin laminate comprises a base layer composed of the base resin component, an intermediate layer composed of the foamed resin component, and a surface layer composed of the resin cover in this order, and an average diameter of cells existing in a region of the intermediate layer on a side of the surface layer is smaller than an average diameter of cells existing in a region on a side of the base layer. The foamed resin component may be previously joined to the resin cover. Alternatively, the foamed resin component may be joined to both of the resin cover and the base resin component in the cavity. The air is of course included in the gas referred to herein. The average diameter referred to herein is determined such that rectangular parallelepipeds of 1 mm$^3$ are cut out as resin blocks which constitute the region on the side of the surface layer and the region on the side of the base layer of a flat portion of the intermediate layer respectively, diameters of all cells except for cut cells disposed on one side of each of the rectangular parallelepipeds are entirely measured to determine a sum thereof, and the sum is divided by a number of the measured cells.

As described above, in the foamed resin component provided for the molded resin laminate, the average diameter of the cells existing in the region of the intermediate layer on the side of the surface layer is smaller than the average diameter of the cells existing in the region on the side of the base layer. Accordingly, the occurrence of the shrinkage cavity is remarkably suppressed at a bent portion or a curved portion. That is, the bent portion or the curved portion is formed with a good dimensional accuracy. Further, because the region of the foamed resin component on the side of the surface layer is excellent in ductility, the strength of the bent portion or the curved portion is improved as compared with that of the molded resin laminate concerning the conventional technique.

It is preferable that the average diameter of the cells existing in the region of the intermediate layer on the side of the surface layer is $1/20$ to $3/4$ of the average diameter of the cells existing in the region of the intermediate layer on the side of the base layer. The reason is that the dimensional accuracy and the strength of the bent portion are reliably ensured in this arrangement.

It is preferable that the thickness of the region on the side of the base layer is $1/6$ to $1/2$ of the thickness of the region on the side of the surface layer. The reason is that shrinkage cavity tends to appear if the thickness thereof is less than $1/6$. On the other hand, if the thickness is more than $1/2$, the cost of producing the foamed resin component and the molded resin laminate becomes expensive.

It is preferable that the resin for constructing the region on the side of the surface layer is cross-linked because the strength of the bent portion is further improved thereby.

According to another aspect of the present invention, a method is provided for producing a molded resin laminate comprising a first step of molding a base resin component composed of a molded resin piece by using a first forming machine; a second step of arranging a resin cover between the base resin component held on a first mold of a second forming machine and a second mold with a foamed resin component intervening therebetween; a third step of performing mold clamping for the second forming machine; a fourth step of forming the resin cover by evacuating gas from a cavity of the second forming machine by the aid of the second mold of the second forming machine; and a fifth step of forming the foamed resin component and joining the base resin component and the resin cover to one another with the foamed resin component intervening therebetween by evacuating gas from the cavity by the aid of the mold of the second forming machine on which the base resin component is held and the base resin component; wherein the molded resin laminate, which comprises a base layer composed of the base resin component, an intermediate layer composed of the foamed resin component, and a surface layer composed of the resin cover in this order, is produced; and one, in which an average diameter of cells existing in a region on a side of the resin cover is smaller than an average diameter of cells existing in a region on a side of the base resin component, is used as the foamed resin component.

When the material as described above is used as the foamed resin component, the region of the foamed resin component on the side of the resin cover is excellent in ductility as compared with the region on the side of the base resin component. Accordingly, when the molded resin product having the bent portion or the curved portion is formed, the region on the side of the resin cover is expanded and elongated. Therefore, the occurrence of the shrinkage cavity at the bent portion or the curved portion is remarkably suppressed.

Further, the cells disposed at the bent portion or the curved portion are extended only slightly. Therefore, the occurrence of any crack is extremely suppressed, which would be otherwise caused with the cells connected and joined to one another. Accordingly, it is possible to obtain the molded resin laminate in which the strength of the bent portion is improved as compared with that of the molded resin laminate concerning the conventional technique.

The effect described above can be remarkably found at a sharp bent portion. That is, even when the molded resin laminate having the sharp bent portion is produced, it is possible to obtain the molded resin laminate having a high quality and an excellent strength in which the shrinkage cavity does not appear on the surface layer of the bent portion.

In the second step, it is preferable to use a laminate in which the foamed resin component and the resin cover are previously joined to one another. The reason is that the molded resin laminate can be efficiently produced since the number of forming processes is smaller than that required if both of the foamed resin component and the resin cover are individually joined and formed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The molded resin laminate and the method for producing the same according to the present invention will be exemplified by preferred embodiments, and they will be explained in detail below with reference to the accompanying drawings. Constitutive components corresponding to those shown in FIGS. 10 and 11 are denoted by the same reference numerals, detailed explanation of which will be omitted.

Figure 1:
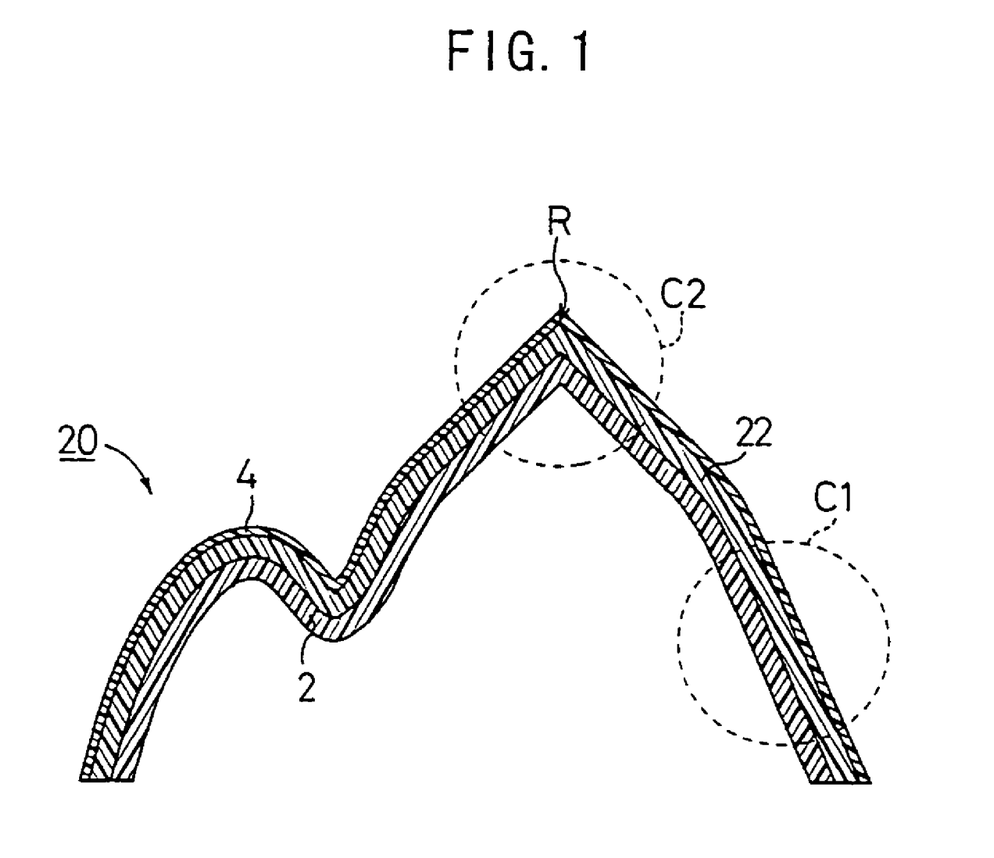
FIG. 1 shows a schematic vertical sectional view illustrating a molded resin laminate according to an embodiment of the present invention.

FIG. 1 shows a schematic vertical sectional view illustrating a molded resin laminate according to an embodiment of the present invention. The molded resin laminate 20 comprises a base layer 2, an intermediate layer 22, and a surface layer 4 which are joined to one another in this order. Each of the layers 2, 22, 4 is composed of a resin material. Among the above layers, the intermediate layer 22 is a foamed resin component composed of, for example, polypropylene (PP) resin or polyethylene (PE) resin. On the other hand, the constitutive material for the base layer 2 is exemplified by PP resin and acrylonitrile-butadiene-styrene copolymer (ABS) resin. The constitutive material for the surface layer 4 is exemplified by thermoplastic polyolefine (TPO) resin, polyvinyl chloride (PVC) resin, and ABS resin. In this arrangement, the ratio of thicknesses of the base layer 2, the intermediate layer 22, and the surface layer 4 is 2 to 6:2 to 6:0.3 to 1.

Figure 2:
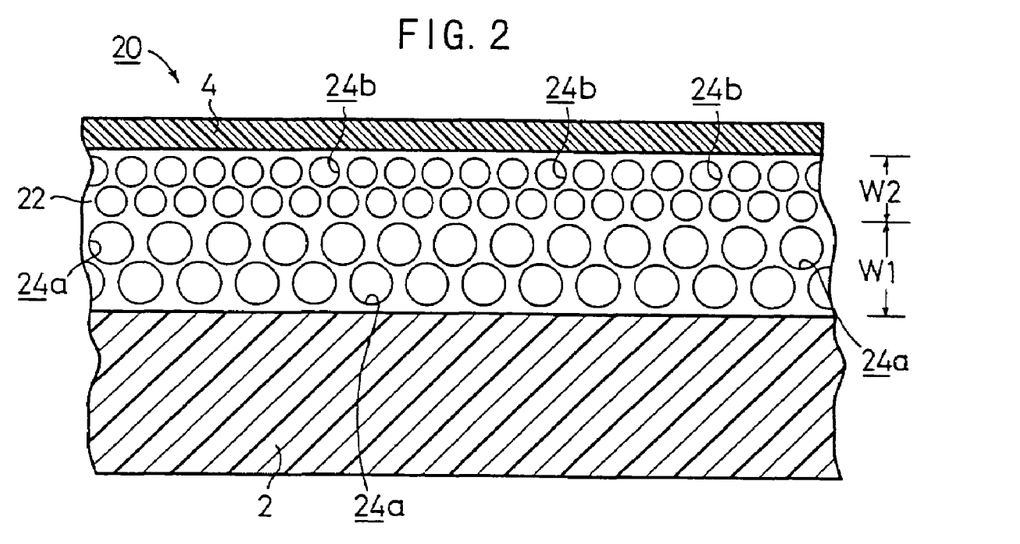
FIG. 2 shows a magnified view illustrating a portion encircled by a circle C1 as shown in FIG. 1.

A portion encircled by a circle C1 in FIG. 1 is magnified and shown in FIG. 2. As shown in FIG. 2, the intermediate layer 22 is divided into a region W1 in which a plurality of large cells 24a exist while being dispersed substantially uniformly, and a region W2 in which a plurality of small cells 24b with an average diameter smaller than that of the large cells 24a exist while being dispersed substantially uniformly. The region W1 is located on the side of the base layer 2. On the other hand, the region W2 is located on the side of the surface layer 4. In this embodiment, the thickness of the region W2 is about ½ of the thickness of the region W1.

The diameters of the respective large cells 24a are substantially equal to one another. The average diameter of the large cells 24a is usually about 1/20 to 3/10 of the thickness of the intermediate layer 22.

Similarly, the diameters of the respective small cells 24b are also substantially equal to one another. The average diameter of the small cells 24b is about 1/20 to 3/4 of the average diameter of the large cells 24a.

That is, when the thickness of the intermediate layer 22 is about 3 mm for example, the thickness of the region W1 is about 2 mm, the thickness of the region W2 is about 1 mm, the average diameter of the large cells 24a is about 0.15 to 0.9 mm, and the average diameter of the small cells 24b is about 0.0075 to 0.675 mm.

Figure 3:
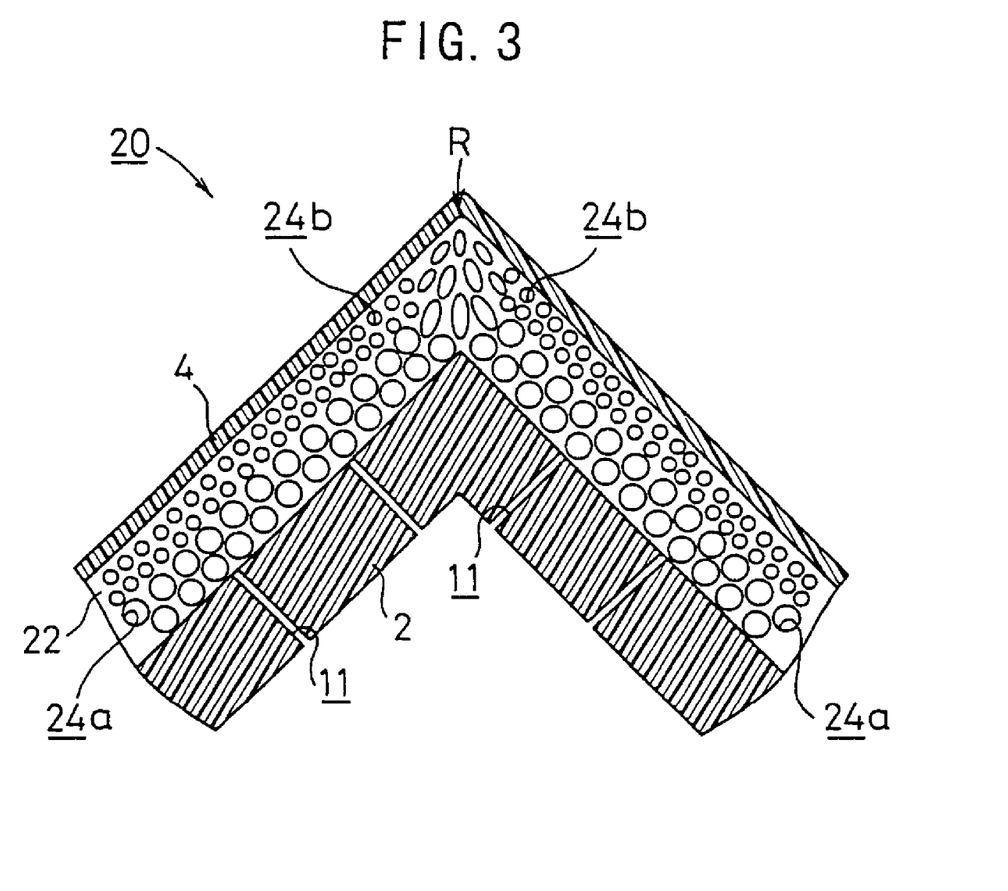
FIG. 3 shows a magnified view illustrating a portion encircled by a circle C2 as shown in FIG. 1.

A portion encircled by a circle C2 in FIG. 1, i.e., a bent section R of the molded resin laminate 20 is magnified and shown in FIG. 3. It is clearly understood from FIG. 3 that the shrinkage cavity does not appear at the bent section R, and a crack is not formed since the small cells 24b disposed in the vicinity of the bent section R are slightly extended.

A method for producing the molded resin laminate 20 will be explained subsequently. The method for producing the molded resin laminate according to the embodiment of the present invention comprises a first step S1 of molding a base resin component composed of a molded resin piece by using a first forming machine; a second step S2 of arranging a resin cover between the base resin component held on a first mold of a second forming machine and a second mold with a foamed resin component intervening therebetween; a third step S3 of performing mold clamping for the second forming machine; a fourth step S4 of forming the resin cover by giving a negative pressure in a cavity of the second forming machine by the aid of the second mold of the second forming machine; and a fifth step S5 of forming the foamed resin component by giving a negative pressure in the cavity by the aid of the mold of the second forming machine on which the base resin component is held and the base resin component.

Figure 4:
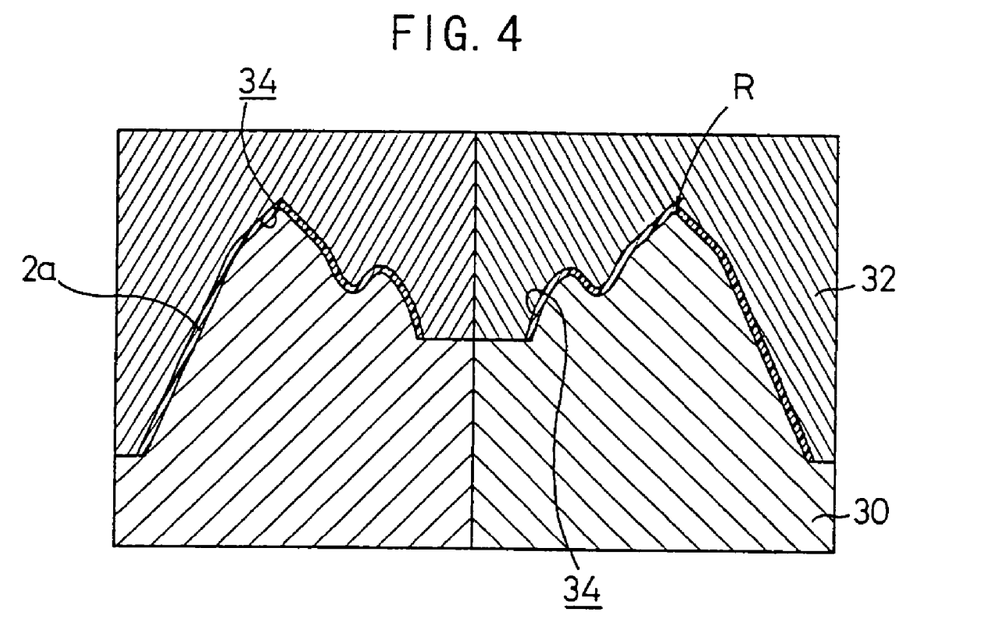
FIG. 4 shows, with partial omission, a vertical sectional view illustrating a state in which a base resin component is prepared by using a molding machine.

As shown in FIG. 4, an unillustrated injection molding machine (first forming machine) is used to mold the base resin component 2a in the first step S1 at first. The unillustrated injection molding machine has a lower mold 30 and an upper mold 32 that is capable of approaching to or separating from the lower mold 30 by energizing an unillustrated actuator mechanism. Specifically, the lower mold 30 and the upper mold 32 are allowed to be in tight contact with each other to form cavities 34, 34. Thereafter, a molten material in which PP resin or ABS resin is melted is injected from an unillustrated injection mechanism. The molten material is introduced into the cavities 34, 34 respectively via unillustrated passages. Two base resin components 2a, 2b are obtained by cooling and solidifying the molten material.

In this procedure, the lower mold 30 is provided with a plurality of unillustrated projections. Therefore, as described later on, holes 11 (see FIG. 3) are formed at portions of the obtained base resin components 2a, 2b corresponding to the projections.

The upper mold 32 is moved upwardly by energizing the unillustrated actuator mechanism to perform mold opening so that the base resin components 2a, 2b may be exposed.

Figure 5:
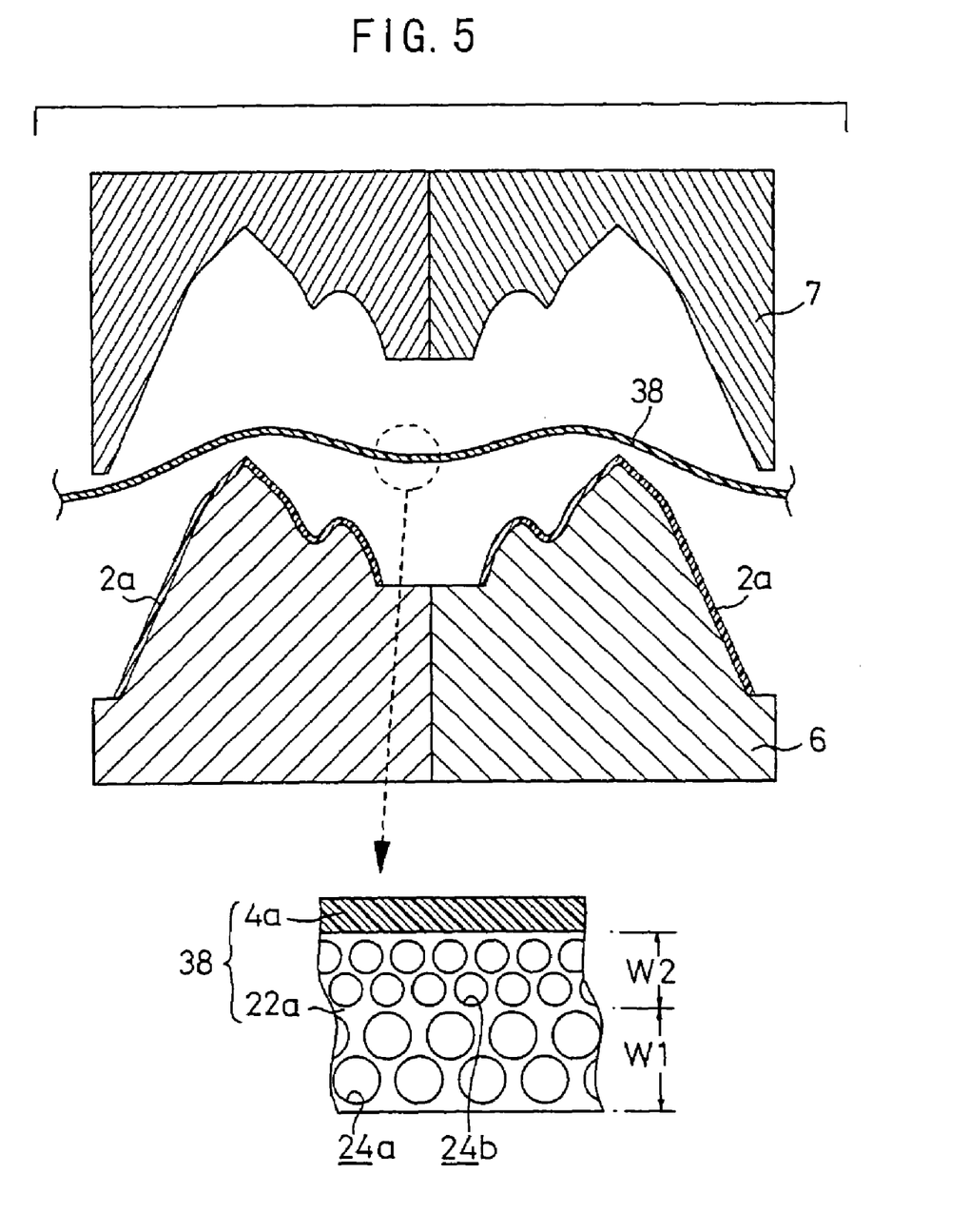
FIG. 5 shows a vertical sectional view illustrating, with partial omission, a state in which a sheet-shaped laminate is arranged between the base resin component and a female mold, and it shows a magnified view illustrating major parts of the sheet-shaped laminate.

Subsequently, as shown in FIG. 5, the base resin components 2a, 2b are held on a male mold 6 of an unillustrated vacuum forming machine (second forming machine) in the second step S2. In this state, an adhesive (not shown) is applied to the surfaces of the base resin components 2a, 2b.

A sheet-shaped laminate 38 composed of the foamed resin component 22a and the resin cover 4a joined to the foamed resin component 22a is arranged between the base resin components 2a, 2b held on the male mold 6 and a female mold 7 (see FIG. 5). As shown in a magnified view illustrating major parts in FIG. 5, the sheet-shaped laminate 38 is arranged so that the foamed resin component 22a may be opposed to the base resin component 2a. As clearly understood from the magnified view illustrating major parts in FIG. 5, one, which is divided into the region W1 with the large cells 24a existing therein and the region W2 with the small cells 24b having the average diameter smaller than that of the large cells 24a existing therein, is used as the foamed resin component 22a.

In this embodiment, the sheet-shaped laminate 38 is prepared, for example, as follows.

At first, a pellet-shaped PP resin or PE resin and a degradable foaming agent are mixed with each other in a mixer to thereby obtain a mixture which is subjected to extrusion molding to form a sheet to be used as a sheet-shaped molded piece.

Subsequently, an electron beam is successively radiated onto one end surface of the sheet-shaped molded piece until a predetermined period of time has elapsed. Thereafter, the entire sheet-shaped molded piece is subjected to a heat treatment. During this process, the sheet-shaped molded piece is divided into a portion in which cells tend to be large (portion composed of resin with a low degree of cross-linking) and a portion in which cells relatively hardly grow (portion composed of resin with a high degree of cross-linking). Accordingly, the obtained foamed resin component 22a is divided into the two regions W1, W2 in which the average diameter is different therebetween (see magnified view of major parts in FIG. 5). That is, the portion composed of the resin with the low degree of cross-linking is formed into the region W1 in which the large cells 24a exist. On the other hand, the portion composed of the resin with the high degree of cross-linking is formed into the region W2 in which the small cells 24b exist having the average diameter smaller than that of the large cells 24a.

While the foamed resin component 22a is prepared as described above, the resin cover 4a is prepared as follows. That is, a pellet of TPO resin, PVC resin, ABS resin or the like is subjected to extrusion molding or calendering forming to obtain the sheet-shaped resin cover 4a.

Subsequently, the resin cover 4a is superimposed onto the side of the region W2 of the foamed resin component 22a, and they are introduced into a heating furnace while being pressed from both of the side of the region W1 of the foamed resin component 22a and the side of the resin cover 4a to make tight contact with each other. A heat treatment is applied in the heating furnace, and thus the foamed resin component 22a and the resin cover 4a are fused to one another. As a result, the sheet-shaped laminate 38 is obtained.

Figure 6:
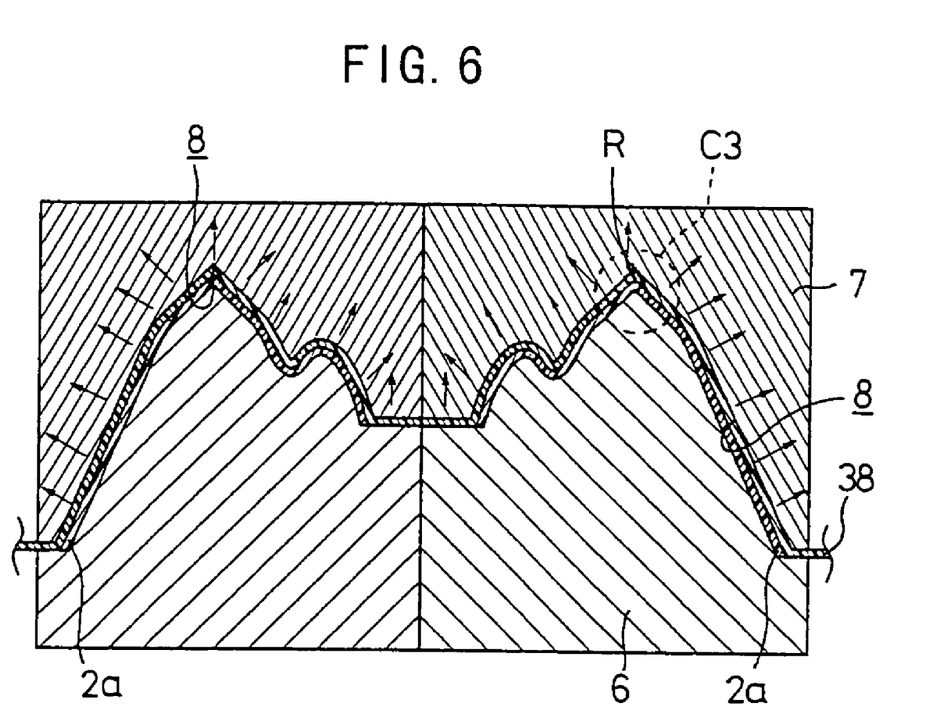
FIG. 6 shows, with partial omission, a vertical sectional view illustrating a state in which the gas is vacuum-evacuated from the inside of cavities in a state in which the cavities are formed.

The sheet-shaped laminate 38 thus obtained is arranged between the base resin components 2a, 2b and the female mold 7 in the second step S2. After that, the unillustrated actuator mechanism is energized to move the female mold 7 downwardly in the third step S3. The female mold 7 and the male mold 6 are subjected to mold clamping as shown in FIG. 6 to form cavities 8, 8. During this process, the sheet-shaped laminate 38 is coarsely bent and deformed along the shape of the female mold 7. Further, the sheet-shaped laminate 38 and the base resin components 2a, 2b are bonded to one another by the aid of the adhesive applied to the surfaces of the base resin components 2a, 2b.

Figure 7:
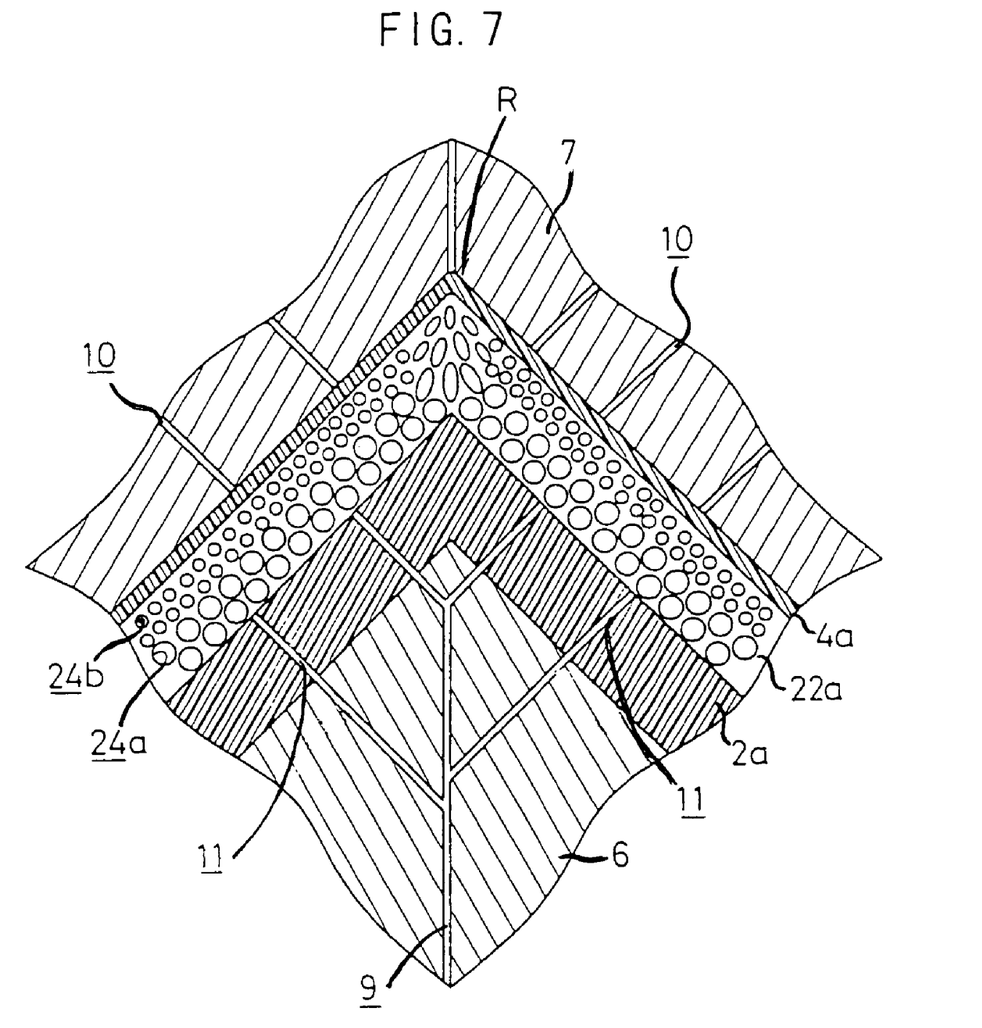
FIG. 7 shows a magnified view illustrating major parts of a portion encircled by a circle C3 as shown in FIG. 6.

As shown in FIG. 7 which is a magnified view illustrating a portion in the vicinity of the bent section R, i.e., a portion encircled by a circle C3 in FIG. 6, the male mold 6 is provided with gas-aspirating holes 9 at positions corresponding to the holes 11 of the base resin components 2a, 2b. The female mold 7 is also provided with gas-aspirating holes 10. The gas-aspirating holes 9, 10 communicate with aspirating tubes (not shown) connected to an aspirating port of an unillustrated evacuating mechanism. That is, the gas in the cavities 8, 8 of the vacuum forming machine can be evacuated (subjected to vacuum evacuation) via the gas-aspirating holes 9, 10 by the aid of the unillustrated evacuating mechanism.

The vacuum evacuation from the gas-aspirating holes 9 or 10 can be performed individually.

Subsequently, in the fourth step S4, the unillustrated evacuating mechanism is energized to perform vacuum evacuation for the gas in the cavities 8, 8 via the gas-aspirating holes 10 of the female mold 7 so that the inside of the cavities 8, 8 may be at a negative pressure (see FIG. 6). Accordingly, the sheet-shaped laminate 38, i.e., the combination of the resin cover 4a and the foamed resin component 22a is bent and deformed more finely along the shape of the female mold 7. Further, a boarding or graining pattern provided on the surface of the female mold 7 is clearly transferred to the resin cover 4a.

The region W2 of the foamed resin component 22a (see the magnified view of major parts in FIG. 5) is excellent in ductility because the average diameter of the small cells 24b existing in the region W2 is small. Therefore, when the sheet-shaped laminate 38 is subjected to the aspiration, as shown in FIG. 7, the region W2 makes tight contact with the female mold 7 with the resin cover 4a intervening therebetween in a state in which the small cells 24b are slightly extended. The resin cover 4a also makes tight contact with the female mold 7 corresponding thereto. Consequently, the sheet-shaped laminate 38 makes tight contact with the female mold 7 without causing the shrinkage cavity. Accordingly, the dimensional accuracy of the bent section R of the molded resin laminate 20 is remarkably improved.

Further, the small cells 24b are extended only slightly. Therefore, the occurrence of any crack is avoided, which would be otherwise caused by using the small cell 24 as a starting point. Additionally, the region W2 is composed of the cross-linked resin as described above. Therefore, the strength of the bent section R is not lowered as well.

Figure 8:
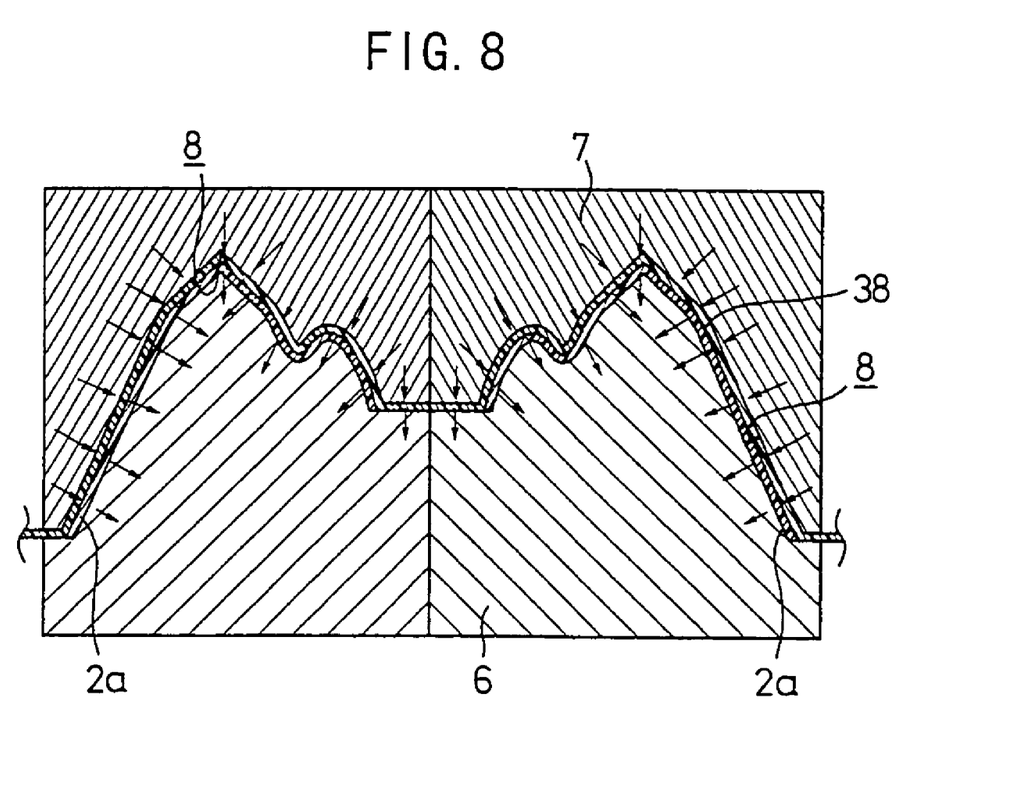
FIG. 8 shows, with partial omission, a vertical sectional view illustrating a state in which the compressed gas is supplied to the inside of the cavities via the female mold, and the gas is evacuated from the inside of the cavities via a male mold.

Subsequently, in the fifth step S5, as shown in FIG. 8, the compressed gas is supplied to the cavities 8, 8 via the gas-aspirating holes 10 of the female mold 7 (see FIG. 7) from an unillustrated compressed gas supply mechanism. Alternatively, the gas-aspirating holes 10 may be open to the atmospheric air. In this state, the unillustrated evacuating mechanism is used to vacuum-evacuate the gas from the inside of the cavities 8, 8 via the gas-aspirating holes 9 of the male mold 6 and the holes 11 formed in the base resin components 2a, 2b. Accordingly, the foamed resin component 22a is tightly contacted and durably joined to the base resin components 2a, 2b attracted by the male mold 6 by the aid of the adhesive. As a result, two pieces of the molded resin laminates 20, 20 are formed, each of which comprises the base layer 2 composed of the base resin component 2a, the intermediate layer 22 composed of the foamed resin component 22a, and the surface layer 4 composed of the resin cover 4a that are joined to one another in this order.

Figure 9:
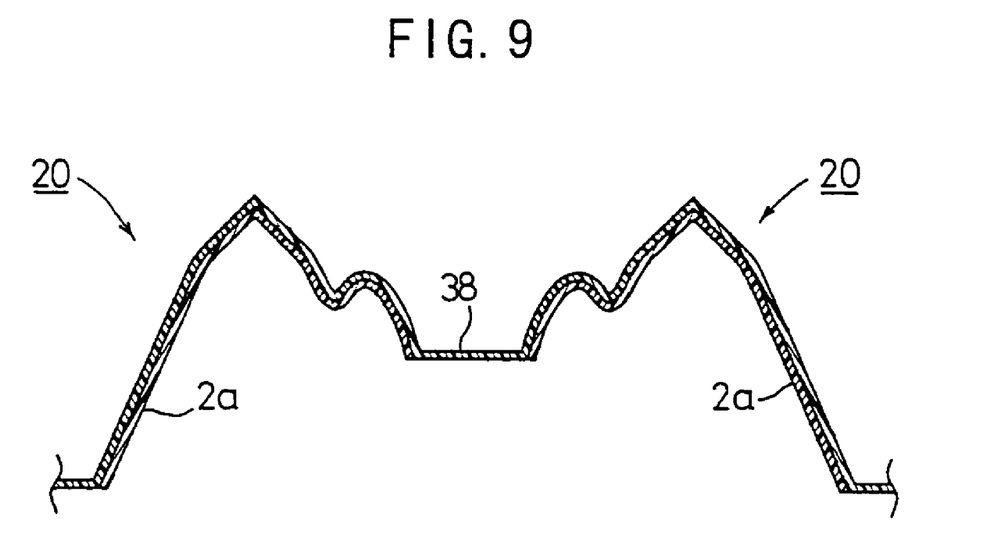
FIG. 9 shows a schematic vertical sectional view illustrating the produced molded resin laminate.

After a predetermined period of time has elapsed, the supply of the compressed gas to the cavities 8, 8 and the vacuum evacuation for the gas in the cavities 8, 8 are completed to perform mold opening. As shown in FIG. 9, two pieces of the molded resin laminates 20, 20 are consequently exposed which are connected to one another by the sheet-shaped laminate 38.

Finally, the sheet-shaped laminate 38 connecting both pieces of the molded resin laminates 20, 20 is cut, and an aftertreatment is applied thereto. Thus, the molded resin laminates 20, 20 symmetrical to one another are obtained. The respective bent sections of the molded resin laminates 20, 20 are excellent in dimensional accuracy and strength. Therefore, the yield of the molded resin laminate 20 is improved.

In this embodiment, the sheet-shaped laminate 38, in which the foamed resin component 22a and the resin cover 4a are joined to one another, is joined onto the base resin component 2a. Alternatively, the foamed resin component 22a may be joined onto the base resin component 2a, and then the resin cover 4a may be joined onto the foamed resin component 22a.

Further, it is possible to perform cutting of the sheet-shaped laminate 38 which connects the molded resin laminates 20, 20 in the cavities 8, 8.

The above embodiment has been explained with an example of the bent section R. Furthermore, the shrinkage cavity does not appear even in the case of a curved section, and the strength of the curved section is excellent in the same manner as described above.

What is claimed is:

1. A method for producing a molded resin laminate comprising:
   a first step of molding a base resin component composed of a molded resin piece by using a first forming machine, the base resin component being formed with multiple holes piercing through the base resin component;
   a second step of arranging a resin cover between the base resin component held on a first mold of a second forming machine and a second mold with a foamed resin component intervening therebetween;
   a third step of performing mold clamping for said second forming machine;
   a fourth step of forming said resin cover by evacuating gas from a cavity of said second forming machine by the aid of said second mold of said second forming machine; and
   a fifth step of forming said foamed resin component and joining said base resin component and said resin cover to one another with said foamed resin component intervening therebetween by evacuating the gas from said cavity by the aid of said mold of said second forming machine on which said base resin component is held,
   thereby forming said molded resin laminate, which comprises a base layer composed of said base resin component, an intermediate layer composed of said foamed resin component, and a surface layer composed of said resin cover in this order,
   wherein an average diameter of cells existing in a region of said foamed resin component on a side of said resin cover is smaller than an average diameter of cells existing in a region of said foamed resin component on a side of said base resin component.

2. The method for producing said molded resin laminate according to claim 1, wherein said average diameter of said cells existing in said region of said foamed resin component on said side of said resin cover is $1/20$ to $3/4$ of said average diameter of said cells existing in said region of said foamed resin component on said side of said base resin component.

3. The method for producing said molded resin laminate according to claim 1, further comprising the step of opening the first molding machine to expose the base resin component after the first step and before the second step.

4. The method for producing said molded resin laminate according to claim 1, wherein the resin cover arranged in the second step is sheet shaped.

5. The method for producing said molded resin laminate according to claim 1, further comprising the step of forming the holes in the base resin component by using projections formed on the first mold.

6. The method for producing said molded resin laminate according to claim 1, wherein the first forming machine and the second forming machine are different machines.

7. The method for producing said molded resin laminate according to claim 1, wherein the first mold is a male mold and the second mold is a female mold.

8. The method for producing said molded resin laminate according to claim 1, wherein the cells having the smaller average diameters are formed closer to the second mold than the cells having the larger average diameters.

9. The method for producing said molded resin laminate according to claim 1, further comprising the step of applying adhesive to the base resin component after the first step and prior to the third step.

10. A method for producing a molded resin laminate comprising:
   a first step of molding a base resin component composed of a molded resin piece by using a first forming machine;
   a second step of arranging a resin cover between the base resin component held on a first mold of a second forming machine and a second mold with a foamed resin component intervening therebetween;
   a third step of performing mold clamping for said second forming machine;

a fourth step of forming said resin cover by evacuating gas from a cavity of said second forming machine by the aid of said second mold of said second forming machine; and a fifth step of forming said foamed resin component and joining said base resin component and said resin cover to one another with said foamed resin component intervening therebetween by evacuating the gas from said cavity by the aid of said mold of said second forming machine on which said base resin component is held, at least a portion of the gas being evacuated through holes in the first mold that are aligned with holes in the base resin component, thereby forming said molded resin laminate, which comprises a base layer composed of said base resin component, an intermediate layer composed of said foamed resin component, and a surface layer composed of said resin cover in this order, wherein an average diameter of cells existing in a region of said foamed resin component on a side of said resin cover is smaller than an average diameter of cells existing in a region of said foamed resin component on a side of said base resin component.

11. The method for producing said molded resin laminate according to claim 10, wherein said average diameter of said cells existing in said region of said foamed resin component on said side of said resin cover is $\frac{1}{20}$ to $\frac{3}{4}$ of said average diameter of said cells existing in said region of said foamed resin component on said side of said base resin component.

12. The method for producing said molded resin laminate according to claim 10, further comprising the step of opening the first molding machine to expose the base resin component after the first step and before the second step.

13. The method for producing said molded resin laminate according to claim 10, wherein the resin cover arranged in the second step is sheet shaped.

14. The method for producing said molded resin laminate according to claim 10, further comprising the step of forming the holes in the base resin component by using projections formed on the first mold.

15. The method for producing said molded resin laminate according to claim 10, wherein the first forming machine and the second forming machine are different machines.

16. The method for producing said molded resin laminate according to claim 10, wherein the first mold is a male mold and the second mold is a female mold.

17. The method for producing said molded resin laminate according to claim 10, wherein the cells having the smaller average diameters are formed closer to the second mold than the cells having the larger average diameters.

18. The method for producing said molded resin laminate according to claim 10, further comprising the step of applying adhesive to the base resin component after the first step and prior to the third step.

* * * * *